June 16, 1942.　　　W. J. ZENNER　　　2,286,248
PRINTING TELEGRAPH APPARATUS
Filed Nov. 13, 1936
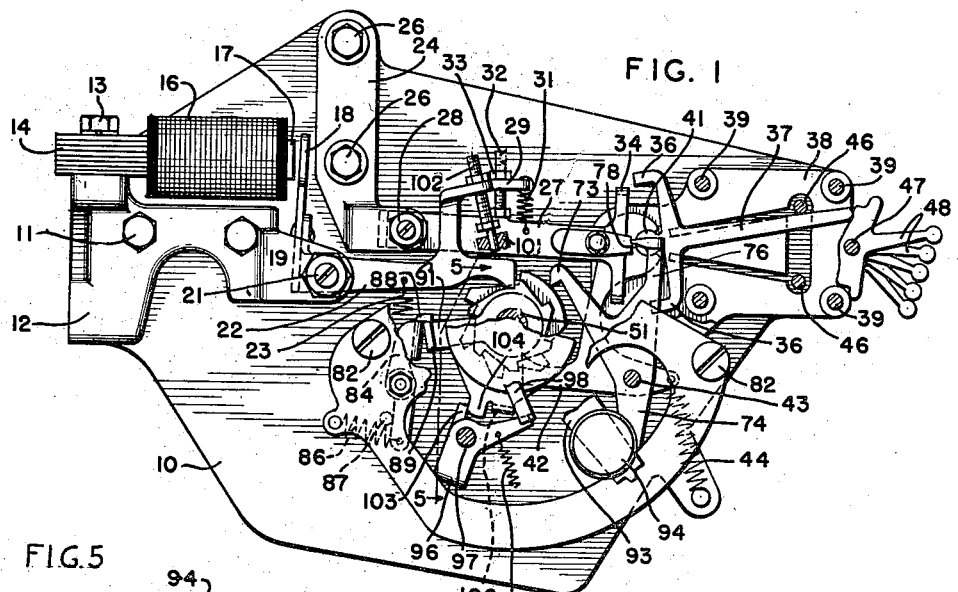
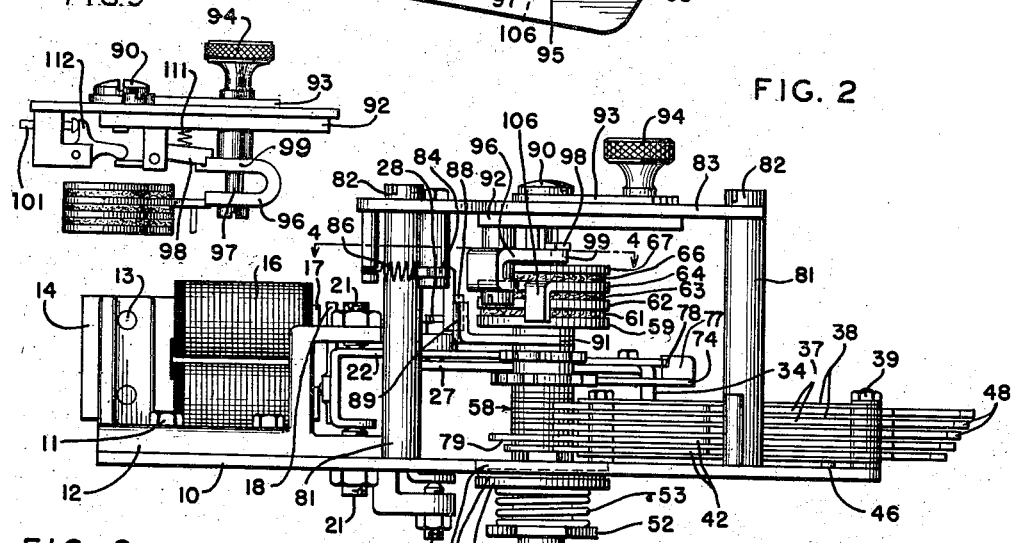
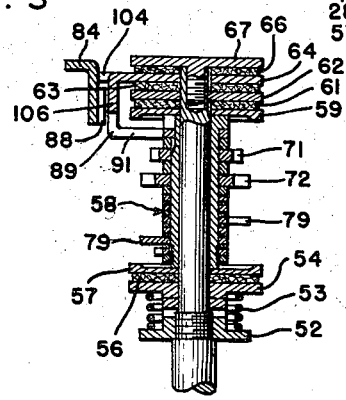
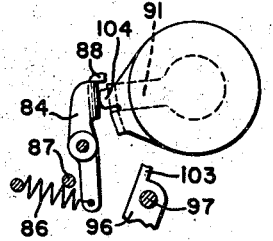
INVENTOR
WALTER J. ZENNER
BY *H. B. Whitfield*
ATTORNEY Patented June 16, 1942

2,286,248

UNITED STATES PATENT OFFICE 2,286,248

PRINTING TELEGRAPH APPARATUS

Walter J. Zenner, Des Plaines, Ill., assignor to Teletype Corporation, Chicago, Ill., a corporation of Delaware Application November 13, 1936, Serial No. 110,684

29 Claims. (Cl. 178—33)

This invention relates to printing telegraph apparatus, and more particularly to a selecting mechanism therefor.

An object of the invention is to increase the range of orientation adjustment of a selecting mechanism for printing telegraph apparatus.

A further object is to provide freedom of a selecting mechanism from accidental locking.

The invention constitutes primarily an improvement in the single magnet selecting mechanism disclosed in Patent No. 1,937,376, granted November 28, 1933, to Walter J. Zenner, to which reference may be had for a complete understanding of the principles underlying the structure and operation of such selecting mechanisms.

It will be observed by reference to the foregoing patent that the rotation of a power-driven cam assembly is controlled by a stop gate which is locked to restrain the cam assembly from rotating when the armature of the selecting magnet is in its attracted position. The cam assembly includes a cam arranged to shift the armature mechanically into its attracted position several times in one cycle of operation. The position of the stop gate is variable to provide for adjustability in the stop position of the cam assembly, and this adjustment is known as the orientation adjustment.

Orientation adjustment is provided for the purpose of coordinating the operation of the selector mechanism with the incoming signal impulses. Telegraph lines may, from various known causes, distort or mutilate signal impulses transmitted thereover. It is desirable to employ the most effective portion of each signal impulse. In order to time the operation of the selector mechanism with the most effective portions of the signal impulses, it has been the custom, in the use of selector mechanisms, for printing telegraph apparatus to determine the two positions of orientation of the stop gate at which the printing telegraph apparatus fails to record properly and between which it will record properly, whereupon the midpoint between the points at which failure begins is chosen as the proper orientation adjustment.

Varying the position of the stop gate as a means of effecting orientation adjustment results in a variation of the stop or rest position of the selector cam assembly, and therefore in a change in the relationships between the several cams and their followers. It has sometimes occurred that these changes in relationship established orientation limits which were encountered before a point of failure of the selector mechanism to interpret a signal combination properly was reached, so that the limits of proper signal interpretation were not established, and the true midpoint was not determined.

The present invention avoids the mechanical limits on orientation adjustment sometimes encountered in selector mechanisms in which orientation adjustment was effected by altering the position of the gate which arrests and determines the rest position of the selector cam assembly, by providing an invariable arrestment position for the cam assembly, and varying the time interval between the reception of the start impulse and the disablement of the stop gate. With this arrangement, the timing of the cycle of operation of the cam assembly with respect to incoming signals, rather than the rest position of that assembly, is variable, and however far apart the limits of proper signal interpretation may be, the midpoint of the range between those limits may be established without interference from local mechanical limitations.

Another characteristic of selector mechanisms of the type shown in the above identified patent is that under certain conditions, an inexpert operator may establish an orientation adjustment which results in locking of the selector mechanism in inoperative state. For example, the selector cam stop gate may be adjusted to such position that it arrests the cam assembly while the armature oscillating cam is holding the armature in its position of attraction. As previously stated, the armature must fall away from its position of attraction in order to release the stop gate, which it cannot do because it is held by the armature cam. The cam assembly must be rotated in order to release the armature, but it is restrained by the stop gate, and thus the selector cam assembly is locked and is unable to respond to signals until a different orientation adjustment shall have been effected manually.

Briefly, the improvement resides in the provision of a non-adjustably positioned latch for arresting the selector cam assembly so that its stop position shall be invariable with respect to stationary parts of the selector mechanism and a latch releasing arm connected to the cam assembly driving shaft through friction discs so as to be capable of being rotated thereby and arranged to trip the cam arresting latch during a cycle of rotation and to be arrested by an adjustable stop gate.

For a complete understanding of the invention, reference may be had to the following detailed description, to be considered in connection with the accompanying drawing, in which, Fig. 1 is a plan view partly in section of a single magnet selector mechanism embodying the invention;

Fig. 2 is an elevational view of the selector mechanism;

Fig. 3 is a vertical sectional view of the selector cam assembly;

Fig. 4 is a horizontal sectional view taken on the line 4—4 of Fig. 2; and

Fig. 5 is a sectional view taken substantially on the line 5—5 of Fig. 1.

Referring now to the drawing and particularly to Figs. 1 and 2, reference numeral 10 indicates a mounting plate for a selector mechanism for printing telegraph apparatus. Plate 10 has mounted thereon by bolts 11 a casting 12 on which is adjustably mounted by bolts 13 a U-shaped magnet core 14. Each arm of the U-shaped core 14 supports a winding 16, and the combination of core 14 and windings 16 constitutes an electromagnet. The free ends of the arms of the core 14 constitute pole faces 17 with which there cooperates an armature 18 secured to one arm 19 of a bell crank lever pivotally mounted by means of pivot screws 21 on the casting 12. Arm 22 of the bell crank lever which supports armature 18 terminates in a cam follower portion which is maintained in engagement with a cam by a tension spring 23 for a purpose which will be described later. It may be stated at this point, however, that the bell crank lever, composed of the arms 19 and 22, may be designated as the armature lever of a single magnet selector mechanism.

Plate 10 also carries a bracket 24 secured thereto by screws 26, which pivotally supports a selector lever 27 by pivot screws 28. Arm 22 of the armature lever has extension 29 which is engaged by one end of a tension spring 31, the other end of which is attached to selector lever 27. An abutment screw 32 threadedly engages the extension 29, and its headed end abuts the selector lever 27 to determine the minimum distance between lever arm extension 29 and selector lever 27 and to maintain spring 31 under tension. A lock nut 33 locks screw 32 when the latter has been adjusted to the desired position.

At its outer end the selector lever 27 has depending arms 34 arranged to cooperate with either of two abutments 36 of a plurality of thin, flat, selector fingers 37. The selector fingers 37 are arranged one above the other, and are separated by thin plates 38 mounted on posts 39 carried by the mounting plate 10. Each of the selector fingers 37 has intermediate its abutments 36 a disc-like portion 41 which is retained in a correspondingly shaped recess in a bell crank lever 42 pivotally mounted at 43 and normally urged in clockwise direction by a tension spring 44. Each of the selector fingers 37 is capable of rotation about the center of its disc-like portion 41 within limits established by stop pins 46 carried by the mounting plate 10. Adjacent the ends of the selector fingers 37 and substantially in direct line with the pivot screws 28 and the disc-like portions 41 of selector fingers 37, the mounting plate 10 carries a pivot pin 47 upon which are pivotally mounted a plurality of T-levers 48. The T-levers 48 are arranged to be articulated to permutation code members (not shown), as disclosed in U. S. Patent No. 1,745,633, granted February 4, 1930, to S. Morton et al. and each is arranged to be engaged by the outer end of one of the selector fingers 37. The selector fingers 37 are adapted to be drawn leftwardly, as viewed in Fig. 1, by the associated bell crank levers 42 and simultaneously rocked into engagement with either of the stop pins 46 by cooperation of one of the abutments 36 with one of the depending arms 34 of selector lever 27 in the manner fully described in the above mentioned patent. When the selector fingers 37 are returned to their extreme rightward position by clockwise rotation of the bell crank levers 42, those which have been shifted from one to the other of the stop pins 46 rotate their associated T-levers 48 clockwise or counterclockwise corresponding to the rotational position of the selector finger.

The rocking of the bell crank lever 42 to effect permutative setting of the T-levers 48 is accomplished by cam projections on a cam barrel assembly which consists of a plurality of cams provided for accomplishing various results. Referring now particularly to Fig. 2, attention is directed to shaft 51 which is continuously driven from a motor (not shown). Below the mounting plate 10 the shaft 51 has threaded thereon a nut 52 above which is a compression spring 53, one end of which presses against the nut 52 and the other end of which presses against a disc 54 keyed to shaft 51, so as to be rotatable therewith but capable of movement axially thereof. Next above the disc 54 is a friction disc 56 of any suitable material such as felt, above which is a disc 57 similar to the disc 54 and fixed to a cam assembly indicated generally by the reference numeral 58 which includes a plurality of cams which will be specifically identified later. At its upper end the cam assembly has a disc 59 similar to the disc 57 and rigid with respect to the cam assembly 58. Above the disc 59 there are, in order, a resilient disc 61, a metal disc 62 keyed to shaft 51, a resilient disc 63, a metal disc 64 not fixedly connected to the shaft 51, a resilient disc 66, and uppermost disc 67 having a stud threadedly engaging shaft 51. The several discs above identified constitute a friction assembly confined between the nut 52 and the disc 67, frictional engagement between the several discs being accomplished by compression spring 53. The discs that are keyed to shaft 51 are driven therewith, and the discs 57 and 59 rigid with the cam assembly 58 and the disc 64 are frictionally driven when not restrained from rotation.

The uppermost cam 71 of cam assembly 58 is aligned with the free end of arm 22 of the armature lever and is provided with a plurality of apices corresponding in number to the number of impulses in a signal code combination including the stop or rest impulse. Cam 71 when rotated repeatedly rocks the armature lever counterclockwise to bring armature 18 into engagement with pole face 17 of the selector magnet. Below cam 71 is a cam 72 also provided with a plurality of apices and having in alignment therewith a follower arm 73 of the locking bell crank lever 74 pivotally mounted on pivot pin 43. Arm 76 of bell crank lever 74 terminates in a locking blade 77 presented toward the end of selector lever 27 which carries at its outer end the locking lug 78. When cam 72 rocks locking bell crank lever 74 clockwise to withdraw blade 77 from blocking position with respect to lug 78, selector lever 27 is free to move under the control of flutter lever 22 through the agency of spring 31 or abutment screw 32. Below cam 72 there are a plurality of cam projections 79 helically arranged around cam assembly 58, each of which is adapted to rock one of the bell crank levers 42 counterclockwise to cause leftward movement of the associated selector finger 37.

Mounting plate 10 supports a plurality of posts 81 on the top of which screws 82 retain plate 83. The latter plate pivotally supports a latch 84 which is biased for rotation in a clockwise direction by tension spring 86 and which has its rotation in that direction limited by a stop post 87. Latch 84 carries at the end opposite to that to which the spring biasing is applied a lug 88, which, when latch 84 is in its extreme clockwise position, is disposed in the path of an upwardly turned extension 89 of a stop arm 91 fixed to the cam assembly 58. The cam assembly is thus restrained from rotating in response to the torque applied by the friction discs except when latch 84 is tripped.

Plate 83 carries a pivot screw 90 which is disposed coaxially of shaft 51. Pivot screw 90 pivotally supports, below plate 83, a subordinate plate 92 which is movable through a relatively wide angle with respect to plate 83. An arm 93 also mounted on pivot screw 90, above plate 83, has extending therethrough the shank of knurled screw 94 which threadedly engages subordinate plate 92. Screw 94 serves to draw arm 93 and plate 92 into clamping engagement with plate 83, whereby plate 92 may be retained in any desired position of adjustment.

Plate 92 carries on the under side thereof a stop gate 96 pivotally mounted on pin 97 and biased in clockwise direction by spring 95. A latch lever 98 pivotally mounted on the under side of plate 92 is urged by spring 111 (Fig. 5) in a direction to engage arm 99 of stop gate 96. Latch lever 98 has a shoulder which blocks arm 99 of stop gate 96 and prevents counterclockwise rocking of the stop gate. The latch lever 98 is rocked to lift the shoulder out of blocking engagement with the stop gate by a plunger pin 101 in the operating path of which is disposed one arm of a bell crank 112, the other arm of which engages latch lever 98. An operating screw 102 carried by extension 29 of flutter lever arm 22 in alignment with plunger 101 shifts the plunger to effect the release of the stop gate when the the flutter lever is in its extreme clockwise position, at which time armature 18 is out of engagement with pole face 17. Plunger 101 is retracted by spring 111 and permits latching lever 98 to latch stop gate 96 when flutter lever 22 is in its extreme counterclockwise position, at which time armature 18 engages pole face 17. Stop gate 96 has a projection 103 which, when the stop gate is locked by latch 98, is disposed in the path of a radially extending arm 104 of disc 64. Disc 64 is thus restrained from rotation by stop gate 96, and when the stop gate is released by latch 98, disc 64, due to its frictional connection with shaft 51, rotates in a clockwise direction and trips latch 84, whereby cam assembly 58 is released for rotation. As arm 104 releases latch 84, depending arm 106 of disc 64 moves in behind and engages upward extension 89 of cam barrel stop arm 91, thus aiding in driving the cam assembly and reducing slippage of the cam assembly under load. Disc 64 thus rotates with cam assembly 58, and as each completes one revolution, it is stopped by its respective stop member, the cam assembly being stopped by latch 84 and disc 64 being stopped by stop gate 96. Changing the position of plate 92 by moving arm 93 changes the angular distance between blocking projection 103 of stop gate 96 and blocking projection 88 of stop gate 84, and therefore varies the time interval between the release of disc 64 for rotation and the release of cam assembly 58 for rotation.

The selector mechanism herein described is adapted to operate upon the start-stop principle to position a set of selector elements in accordance with permutation code combinations of impulses applied to the windings 16 of the electromagnet. Preferably the selector mechanism is intended to be operated upon code signal combinations comprising current and no-current impulses in which the marking condition is represented by current on the line resulting in energization of the selector magnet; and a spacing signal is represented by an absence of current on the line, which results in deenergization of the selector magnet. When the selector is in operative condition but is responding to a stop or rest signal on the line, winding 16 of the selector magnet is energized and armature 18 is held against the tension of spring 23, as a result of which plunger 101 is retracted and shoulder of latch 98 engages arm 99 of stop gate 96 and restrains the latch releasing disc 64 from rotating. The first impulse of a signal combination is the start impulse, which is represented by a spacing signal whereby armature 18 is released and armature lever bell crank comprising arms 19 and 22 is rocked clockwise by spring 23 to cause shifting of plunger 101 and release of stop gate 96. Disc 64 being under continuous torque overcomes the tension of spring 95 and escapes from stop gate 96 and rotates a trip latch 84 and simultaneously to achieve driving engagement with selector cam assembly stop arm 91, whereupon cam assembly 58 and disc 64 rotate together due to the driving effect of shaft 51 transmitted through the several resilient friction discs.

As arm 104 of disc 64 approaches stop gate 96, the last of the signal impulses in a signal combination; namely, the stop pulse, causes the selector magnet to be energized to hold lever arm 22 and the plunger pressing screw 102 out of pressing engagement with plunger 101 whereby latch 98 engages and holds stop gate 96 stationary, which blocks arm 104 of disc 64 and causes that disc to come to rest upon the completion of one revolution. Cam assembly 58 and stop arm 91 continue to rotate until the stop arm engages lug 88 of latch 84, whereupon the cam assembly is brought to rest in its stop position. The selector mechanism is then in condition for the reception of another code combination of impulses.

During the rotation of the selector cam assembly 58, cam 71 rocks bell crank lever arm 22 counterclockwise a plurality of times to bring armature 18 periodically into engagement with the selector magnet pole face 17. If, at the instants of such engagement, the selector magnet is energized by a signal pulse, armature 18 will be held until the termination of that pulse, when lever arm 22 will be permitted to return into engagement with cam 71. During the same cycle of rotation, the selector fingers 37 are drawn leftwardly successively, under the control of cam projections 79, in timed relation to the rocking of flutter lever arm 22 and armature 18, and selector lever 27 assumes clockwise or counterclockwise positions in accordance with the holding or non-holding of armature 18 by the selector magnet. When the armature is held, selector lever 27 assumes its extreme counterclockwise position, and any selector finger 37 which is then shifted leftwardly by its associated bell crank 42 will have its uppermost abutment (as viewed in Fig. 1) brought into engagement with the uppermost depending arm 34 of selector lever 27, whereby the particular selector finger 37 will be shifted into its extreme clockwise position unless it is already in that position, in which case it will undergo no rotational movement. Selector fingers 37 which are reciprocated leftwardly when the selector lever 27 is in its extreme clockwise position, which it occupies when the selector magnet is deenergized during a given impulse interval, will be shifted into their extreme counterclockwise positions. The positions occupied by the selector fingers 37 at the end of a code signal combination determine the positions of the T-levers 49, which are arranged to be articulated to code bars or other permutation code elements as previously set forth.

It will be observed that all of the operations within the selector mechanism; namely, the reciprocation of the selector fingers 37, the locking and unlocking of selector lever 27 by locking bell crank 76, and the operation of the armature lever, are effected by cam assembly 58, the rotation of which is controlled by the start and stop pulses of a code signal combination. It is therefore highly desirable to have the cycle of operation of the cam assembly 59 so coordinated with the incoming signal impulses that each selective condition established within the selector magnet shall result in the proper setting of the selector finger 37 associated with that signal impulse. Heretofore, it has been the custom according to one form to control the stop position of the selector cam assembly by means of the orientation adjustment mechanism comprising the arm 93, plate 92, and stop gate 96 whereby the stop positions of the several cams with respect to their followers could be varied. With such an arrangement, the selector cam assembly 58, is released for rotation immediately upon reception of a start impulse, and the several elements controlled by the selector cam assembly are actuated in certain timed relation to the incoming signals, dependent upon the stop position of the cam assembly with respect to its follower. In the system of operation of a form previously employed, the range of orientation adjustment was limited, due to the necessity of stopping the selector cam assembly in such position that a clearance was provided between the armature lever and its associated cam whereby the stop gate latch could be operated when the start pulse resulted in release of the selector magnet armature. This necessitated the presentation of one of the low portions of the armature cam in alignment with the cam follower portion of the armature lever in the stop position of the selector cam assembly.

The arrangement herein described permits the operation of the selector cam controlled members to be coordinated with incoming signal impulses without varying the stop position of the selector cam assembly relative to its followers. This is accomplished by starting the cam assembly 58 a predetermined interval after the start impulse is evidenced by release of the selector magnet armature. The interval of delay in the starting of the selector cam assembly is variable through variation in the orientation adjustment. With this arrangement, a variation in starting time with respect to incoming signals rather than a variation in starting position with reference to such signals is afforded, and a limitation heretofore present in the amount of orientation adjustment that could be effected no longer exists.

It is to be understood that the invention is not limited to the single embodiment shown and described herein, but is capable of modification and rearrangement within the scope of the appended claims.

What is claimed is:

1. In a machine, a cam controlled mechanism, a power driven cam, means for arresting said cam in invariable position with respect to the controlled mechanism, means for tripping said arresting means, means for operating said tripping means, and means for varying the instant of the effective operation of said tripping means on said arresting means by its operating means.

2. In a mechanism controlled jointly by electromagnetic and mechanical devices, an electromagnet having an armature, a power driven cam having a follower lever associated therewith, said armature and follower lever rigidly connected together, means for arresting said cam in invariable relation to said follower lever, power driven means for tripping said arresting means, means controlled from said follower lever for restraining said tripping means, and means for varying the distance between said last mentioned means and said arresting means.

3. In a mechanism controlled jointly by electromagnetic and mechanical devices, an electromagnet having an armature, a power driven cam having a follower lever associated therewith, said armature and follower lever rigidly connected together, means for arresting said cam in invariable position with respect to said follower lever, power driven means for tripping said arresting means, means actuated by said follower lever upon release of said armature by said electromagnet for disabling said restraining means, and means for variably controlling the time interval between the disablement of said restraining means and the tripping of said arresting means.

4. In a selector mechanism, a rotatable shaft, a cam assembly carried thereby and having frictional engagement therewith, a plurality of selector elements to be operated successively by said cam assembly, a stop arm fixed to said cam assembly, a stop latch pivoted at a fixed point in said selector mechanism, and having a portion disposed in the path of said stop arm, a stop latch releasing arm also carried by said shaft and having frictional engagement therewith, a stop gate pivoted on a movable member in said mechanism and having a portion disposed in the path of a portion of said stop latch releasing arm, and means carried by said movable member for disabling said stop gate.

5. In a selector mechanism, a plurality of selector elements, power driven means for operating said selector elements successively, means for arresting said power driven means in invariable position with respect to said selector elements, power driven means for tripping said arresting means, variably positionable means for arresting said tripping means, and signal controlled means for releasing the last mentioned means.

6. In a selector mechanism, a plurality of selector elements, power driven means for operating said selector elements successively, means for arresting said power driven means in invariable position with respect to said selector elements, power driven means for tripping said arresting means, and variably positionable means for arresting said tripping means.

7. In a selector mechanism, a set of selector elements, power driven means for operating said selector elements successively, means for arresting said power driven means, signal responsive means, means under the control of said signal responsive means, and means for disabling said arresting means a predetermined interval after said signal responsive means exercises its control over said last recited means.

8. In a selector mechanism, a frictionally driven cam assembly, a set of selector elements to be operated by said cam assembly, a stop arm fixed to said cam assembly and having an upstanding portion, a stop member pivoted in the path of said stop arm, and a frictionally driven stop release arm having a depending portion in circumferential alignment with the upstanding portion of said stop arm adapted to engage said upstanding portion and aid in driving said cam assembly.

9. In a selector mechanism, a plurality of selector elements, power driven means for operating said selector elements successively, a single element cooperating with all of said selector elements for determining the selective operation thereof, a power driven cam, means responsive to electrical conditions, an element dually controlled by said cam and said last mentioned means for controlling said single element, means for arresting said cam, means for tripping said arresting means, and means controlled by said dually controlled means for arresting said tripping means.

10. In a printing telegraph selector system, means responsive to code combinations of selecting conditions, rotary selecting elements controlled by said means, arresting means for said rotary selecting elements, means for tripping said arresting means, and means for varying the distance through which said last mentioned means is actuated to effect tripping.

11. A rotary selector mechanism including a start-stop rotor, stopping means for said rotor, starting means responsive to a uniform signalling condition at the beginning of a signal, means for operating said starting means, and means for varying the operative relationship between said starting means and said stopping means.

12. A rotary selector mechanism including a start-stop rotor, stopping means for said rotor, starting means responsive to a uniform signalling condition at the beginning of a signal, means for operating said starting means, and cam means effective through said starting means to disable said stopping means.

13. A rotary selector mechanism including a start-stop rotor, stopping means for said rotor, starting means responsive to a uniform signalling condition at the beginning of a signal, means for operating said starting means, means effective through said starting means under its operation to disable said stopping means, and means for varying the operative relationship between the disabling means and said stopping means.

14. In a selective apparatus, selecting means, a line magnet, an armature for said line magnet responsive to received electrical impulse conditions, spring-and-cam means effective through said armature for urging said armature to assume positions in accordance with electrical signals impressed on said magnet, means controlling the operation of said spring and cam means, and means for insuring the effectiveness of said spring and cam means irrespective of its operative position through the control of said last recited means.

15. In a selective apparatus, selecting means, a member for controlling the operation of said selecting means, an electromagnet, an armature for said electromagnet responsive to received electrical impulse conditions and operatively associated with said member, spring means for urging said armature to move in response to certain conditions of said electromagnet, means for periodically rocking said member to control the movement of said armature, means controlling the operation of said rocking means, and means for insuring the effectiveness of said rocking means irrespective of its operative position through the control of said last recited means.

16. In a telegraph mechanism, a cyclically operable member, means responsive to electrical conditions, a first member, a second member, said first member dually controlled by said cyclically operable member and said means, means controlling the release of said cyclically operable member, and means to insure the effectiveness of said cyclically operable member through the control of its control means.

17. In a printing telegraph machine, a cam controlled mechanism, a power driven cam, means for arresting said cam in invariable position with respect to said controlled mechanism, means for rendering said arresting means ineffective, signal responsive means, means for operating said rendering means, and means for varying the instant of control of said rendering means on said arresting means following the operation of said signal responsive means.

18. In a selector mechanism, a set of selector elements, power driven means for operating said selector elements successively, means for arresting said power driven means, signal responsive means, means under the control of said signal responsive means, means for disabling said arresting means an interval after said signal responsive means exercises its control over said last recited means, and means for varying said interval.

19. In a selector mechanism, a first and second rotatable members, an electro-magnetic means, means responsive to said electro-magnetic means for initiating the rotation of said first rotatable member, means operable by said first rotatable member during the rotation thereof to initiate the rotation of said second rotatable member and means for varying the time of operation of said last mentioned means relative to the initiation of the rotation of said first rotatable member.

20. In a receiving selector mechanism comprising a magnet, driving means, first and second rotatable members frictionally driven by said means, a stop actuated in accordance to the energization and deenergization of said magnet to arrest and initiate respectively the rotation of said first rotatable member, a stop for said second rotatable member, a manually adjustable member and means comprising said last mentioned stop, said manually adjustable member and said first rotatable member whereby said second rotatable member is released for rotation an adjustable period after the release of said first rotatable member.

21. In a selector, a plurality of selectors, driving means, a rotatable distributor member frictionally driven by said driving means for successively actuating said selectors, a stop for said rotatable member, an electromagnet and means controlled by said driving means for actuating said stop to release said rotatable member for rotation with said driving means.

22. In a receiving selector comprising a magnet, first and second rotatable members, means controlled by the deenergization of said magnet for permitting rotation of said first rotatable member and by the energization of said magnet for stopping rotation of said first rotatable member at the completion of a revolution, means operable by said first rotatable member during the rotation thereof for permitting rotation of said second rotatable member, and selector means operable by said second rotatable member.

23. In a receiving selector comprising a magnet, a first and second rotatable members, means controlled by the deenergization of said magnet for permitting rotation of said first rotatable member and by the energization of said magnet for stopping rotation of said first rotatable member at the completion of a revolution, means operable by said first rotatable member during the rotation thereof for permitting rotation of said second rotatable member, and means for varying the time of operation of said last mentioned means relative to initiation of rotation of said first rotatable member while one or both of said rotatable members are rotating or at rest.

24. In a selector mechanism, a plurality of selector elements, an assembly of cams for controlling said selector elements individually, means for rotating said assembly of cams, means for arresting said cams in invariable position with respect to said selector elements, rotatable means for tripping said arresting means, means for driving said tripping means, and means for varying the distance through which said tripping means is rotated by its driving means to effect tripping of said arresting means.

25. In a selector mechanism, a plurality of selector elements, an assembly of cams for controlling said selector elements individually, means for rotating said assembly of cams, means for arresting said cams in invariable position with respect to said selector elements, rotatable means for tripping said arresting means having a fixed cycle of operation including effective and restorational portions, and means for varying the effective and restorational portions of said cycle.

26. In a selector mechanism, a first and a second rotatable member, an electromagnetic means, means responsive to said electromagnetic means for initiating the rotation of said first rotatable member, means operable by said first rotatable member during the rotation thereof for initiating the rotation of the second rotatable member, a plurality of selector elements selectively positionable individually by said second rotatable member under control of said electromagnetic means, and means for varying the time of positionment of said selector elements relative to the initiation of rotation of said first rotatable member.

27. In a receiving selector mechanism, an electromagnet, driving means, first and second rotatable members frictionally driven by said means, a stop actuated in accordance with the energization and de-energization of said magnet for arresting and initiating respectively the rotation of said first rotatable member, a stop for said second rotatable member releasable by said first rotatable member during its rotation as the sole operative effect thereof, and manually adjustable means whereby said second rotatable member is released for rotation an adjustable period after the release of said first rotatable member.

28. In a selector mechanism, a first and a second rotatable member, an electromagnetic means, means responsive to said electromagnetic means for initiating the rotation of said first rotatable member, means operable by said first rotatable member during the rotation thereof for initiating the rotation of said second rotatable member, and means for varying the time of operation of said last mentioned means relative to the initiation of the rotation of said first rotatable member, while maintaining constant the relation of said last mentioned means to said second rotatable member.

29. In a selector mechanism, a power driven shaft, a first and a second rotatable member carried by said shaft and independently operable by said shaft, an electromagnetic means, means responsive to said electromagnetic means for initiating the rotation of said first rotatable member, means operable by said first rotatable member during the rotation thereof to initiate the rotation of said second rotatable member, and means for varying the time of operation of said last mentioned means relative to the initiation of the rotation of said first rotatable member.

WALTER J. ZENNER.